M. HAEBERLEIN.
CHECK VALVE FOR DASHPOTS AND THE LIKE.
APPLICATION FILED AUG. 6, 1919.
1,409,849.   Patented Mar. 14, 1922.
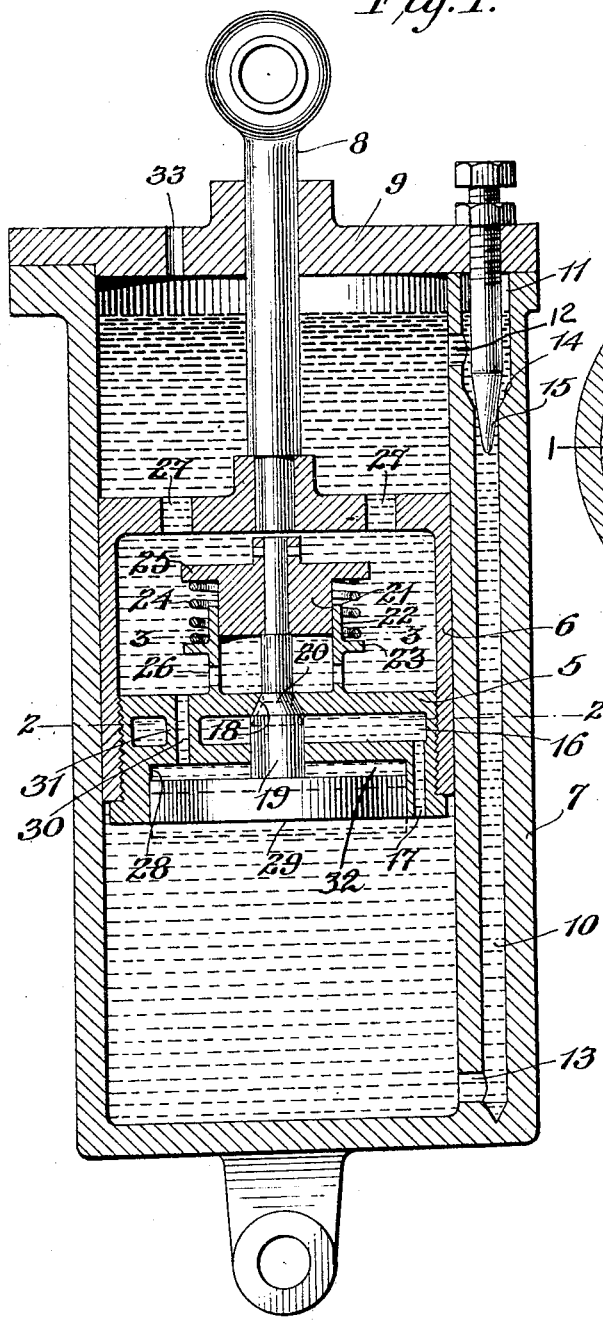
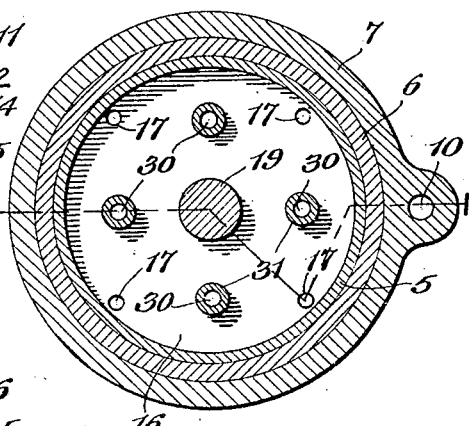
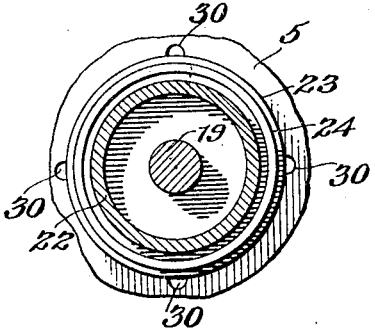
Inventor
Max Haeberlein,
By  Attorney  C. P. Goepel

UNITED STATES PATENT OFFICE.

MAX HAEBERLEIN, OF MOUNTAIN LAKES, NEW JERSEY.

CHECK VALVE FOR DASHPOTS AND THE LIKE.

1,409,849.  Specification of Letters Patent.  Patented Mar. 14, 1922.

Application filed August 6, 1919. Serial No. 315,709.

*To all whom it may concern:*

Be it known that I, MAX HAEBERLEIN, a citizen of the United States of America, and a resident of Mountain Lakes, in the county of Morris and State of New Jersey, having invented certain new and useful Improvements in Check Valves for Dashpots and the like, do hereby declare that the following is a full, clear, and exact description of the same.

This invention relates to check valves and more particularly to check valves such as are used in hydraulic governor brakes or dashpots wherein water, oil, glycerin or other suitable fluid is employed as the braking medium.

It is the primary object of the present improvements to eliminate certain undesirable mechanical features of the ordinary check valve, and to thereby render the action of the valve more reliable and positive in practical use.

It is a more particular object of my invention to provide a valve particularly designed for use in connection with fluid brakes or dashpots, wherein a protected valve seat of relatively small area is provided together with a spring closed valve to coact with the seat and control the passage of the fluid through the valve body, said valve member being also provided with a plunger operating in a chamber formed in the valve body, said body being further provided with an additional fluid passage communicating with said chamber whereby fluid under pressure may enter said chamber to act upon the plunger and move the valve from its seat.

It is a further general object of the invention to provide a check valve of improved construction in which comparatively few operating parts of simple form are employed so that the valve as a whole will function in a positive and reliable manner, not be liable to get out of order, and can be manufactured at comparatively small cost.

With the above and other objects in view, the invention consists in the provision of a check valve as above characterized and in the form, construction and relative arrangement of the several parts as will be hereinafter more fully described and substantially incorporated in the subjoined claims.

In the accompanying drawing wherein I have illustrated one practical embodiment of the invention, Fig. 1 is a sectional view through a fluid brake cylinder and piston, illustrating my improved check valve operatively arranged with the piston, the section being taken on the irregular line 1—1 of Fig. 2;

Fig. 2 is a horizontal section taken on the line 2—2 of Fig. 1, and

Fig. 3 is a detail section taken on the line 3—3 of Fig. 1.

In the usual construction of check valves, there is provided a valve disc which is of but slightly less diameter than the valve body, said disc having a stem guided in the body of the valve and being normally held by means of a suitable spring against the valve seat. The fluid pressure against one side of the disc also serves to force the edge of the disc tightly against the seat and the disc is lifted off of its seat against the action of the spring by the vacuum which is created on the lower side of the valve disc. The area of the valve disc and its seat being comparatively large, the specific pressure between the valve and seat is relatively low and any small particles of foreign matter which may find their way between the valve seat and the disc will prevent a tight closing of the opening through the valve body. Due to the fact that the annular valve seat is of large area the lodgment of such foreign matter between the seat and valve disc results in a comparatively large open space through which there will be considerable leakage of the fluid. It is thus apparent that check valves of this type are unreliable in their action.

It is the primary object and purpose of my improvements to obviate the deficiencies of the common form of check valve, as above referred to, and to provide a construction wherein such small particles of foreign matter as may possibly lodge upon the valve seat will be dislodged upon the closing of the valve against the seat, or crushed or sheared off owing to the high specific pressure upon the valve seat so that there will be little or no leakage of the fluid past the valve. To this end, I provide the valve body 5, which in the illustrated adaptation of the invention is shown as threaded within the lower end of the brake piston 6 which operates in the fluid containing cylinder 7. This cylinder may contain oil, glycerin, water or any other suitable fluid which may be found serviceable as a braking medium. To the other end of the piston 6 the rod 8 is connected, the said rod reciprocating through the cylinder head 9 and being operatively connected at its upper end to a governor mechanism for the engine or other prime mover. The wall of the cylinder 7 is formed with a by-pass 10 which is enlarged at its upper end as shown at 11 and an opening or orifice 12 affording communication between this enlarged end of the by-pass and the upper end of the cylinder chamber. A similar opening 13 likewise affords communication between the lower end of the cylinder chamber and the by-pass. At the lower end of the enlargement 11 of the by-pass a seat 14 is formed for the point of a needle valve 15 which is adjustably mounted in the cylinder head 9. By the adjustment of this valve, the flow of the fluid through the by-pass 10 from one end of the cylinder chamber to the other may be regulated or controlled.

The valve body 5 is formed with a fluid passage or chamber 16 which, as indicated, is preferably of circular form and a plurality of openings 17 extend longitudinally through the valve body and afford communication between this chamber and the space below the body of the valve within the cylinder 7. The valve body 5 is centrally formed with a tapering valve seat 18 opening upon the upper side thereof at its smaller end and communicating with the chamber 16 at its larger end. However, it is not essential that the valve seat shall be tapered in the manner illustrated in the drawing.

19 designates the valve member which, as shown, consists of a cylindrical rod or stem having a portion 20 corresponding to the form of the valve seat 18 for the purpose of seating tightly against the face of said valve seat. The upper end of the valve stem is reduced in diameter and to the same a head 21 is fixed, said head reciprocating in a tubular extension 22 formed on the upper side of the valve body 5. This tubular extension is formed in spaced relation to its upper end with an annular flange 23 which affords a seat for the lower end of the spring 24. The upper end of this spring bears against the under side of a flange 25 which is formed on the head 21. The spring 24 by its expansive action normally urges the valve to its closed position on the seat 18. The tubular extension 22 of the valve body is provided with a plurality of openings 26 so that the fluid may pass from the exterior to the interior of this tubular extension. The fluid is admitted to the hollow piston above the valve body from the upper end of the cylinder chamber through a plurality of openings 27 formed in the closed end wall of the piston 6.

The valve 5 is further provided with a circular chamber 28 of relatively large diameter which opens upon the lower face of said valve body. The valve member 19 has a cylindrical plunger 29 formed upon its lower end which reciprocates within this chamber. A series of openings 30 are formed through the body 5 of the valve, said openings being isolated from the chamber 16 in the valve body by the tubular webs 31 which extend across said chamber and define the walls of said openings. These openings 30 afford communication between the interior of the hollow piston above the valve body 5 and the space indicated at 32 between the upper side of the plunger 29 and the base wall of the chamber 28. It is to be here noted that the maximum extent of opening movement of the valve member 19 is not such that the plunger 29 will move below the open lower side of the chamber 28 so that the upper and lower ends of the cylinder chamber will never be in communication with each other through the openings 30.

In the operation of my improved check valve and in the application thereof as shown in the drawing, the cylinder 7 is initially supplied with oil so that the level of the oil body is above the opening 12 which affords communication between the by-pass 10 and the upper end of the cylinder chamber. In the downward movement of the brake piston it will be understood that the pressure against the lower face of the plunger 29 serves to hold the valve 19 tightly upon the seat 18 and the fluid beneath the piston is forced through the opening 13, upwardly through the by-pass 10 and past the needle valve 15 by which the volume of its flow is controlled and finally through the opening 12 into the upper end of the cylinder. In the reverse or upward movement of the brake piston, a vacuum is created beneath the plunger 29 and atmospheric pressure acting upon the body of oil above the valve body 5 through an opening 33 provided in the cylinder head, causes the oil within the space 32 to exert a downward pressure upon the plunger 29 and thereby move the valve 19 from its seat 18 to the dotted line position shown in Fig. 1. The flow of the fluid from the upper end of the cylinder 7 downwardly through the by-pass 10 is retarded by the needle valve 15 and therefore the greater volume of the oil will pass from the upper to the lower end of the cylinder chamber through the passage in the valve body 5 which is afforded by the opening of the valve member in the manner just explained. Thus the oil or other fluid passes from the interior of the hollow piston through the openings 26 past the valve seat 18 into chamber 16 and finally from this chamber through the series of openings 17 into the lower end of the cylinder. Thus it will be appreciated that in the upward movement of the brake piston, there is practically no resistance to the flow of the fluid from the upper to the lower side of the check valve. It is to be observed that the valve seat 18 of relatively small area is protected by reason of the tubular extension 22 which is formed upon the upper side of the valve body so that the possibility of foreign matter finding its way between the valve and its seat is reduced to a minimum. However, such foreign matter as may lodge upon the face of the valve seat will be either dislodged, crushed or sheared off by the valve 19 as it is forced under the pressure of the fluid in the lower end of the cylinder to its closed position. This pressure is, of course, equal to the area of the plunger 29 multiplied by the fluid pressure in the lower end of the cylinder 7.

While the area of the valve seat 18 in my invention is much less than the area of the valve seat in the usual check valve construction, to which I have above referred, there will nevertheless be secured a flow or passage of the fluid through the valve body in as great or greater volume than in the old valve construction in which the valve disc is lifted very slightly from its seat. This is due to the fact that in the operation of the improved form of valve I am able to provide for a maximum opening movement of the valve member so that there will be no retardation to the free flow of the fluid into and through the chamber 16 of the valve body.

From the foregoing description considered in connection with the accompanying drawing, the construction, manner of operation and several advantages of my improved check valve will be clearly and fully understood. While I have herein illustrated the invention as adapted to use in connection with hydraulic brakes, it will of course be understood that the check valve with such obvious mechanical alterations as may be necessary, may also be advantageously employed in connection with various other apparatus where such a valve may be a particularly desirable adjunct. By means of the improved valve construction, a high degree of operating efficiency is secured. The construction and relative arrangement of the several parts of the check valve, as above referred to, is merely suggestive, and it will be understood that in practice my invention may be exemplified in numerous other alternative constructions. Accordingly, the privilege is reserved of resorting to all such legitimate modifications as may be fairly embodied within the spirit and scope of the invention as claimed.

I claim:

1. In a check valve, a valve body having a fluid passage therein and a valve seat, said body being also provided with an open chamber and a second fluid passage communicating with said chamber and opening upon one side of the valve body and a normally closed valve engaged upon said seat and preventing flow of the fluid through the first named passage, said valve being provided with a plunger operating in said chamber, and actuated by pressure of fluid entering said chamber through the second named passage whereby the valve is moved to its open position.

2. In a check valve, a valve body having a fluid passage therein opening upon the opposite side faces of the valve body and provided with a valve seat, said valve body also having a chamber opening upon one side of the valve body, and a plurality of additional passages opening into said chamber and upon one side of the valve body, and a normally closed spring pressed valve engaged upon said seat and preventing the flow of fluid through the first named passage, said valve being provided with a plunger operating in said chamber and actuated by the pressure of fluid entering the chamber through the second named passages to move the valve to an open position.

3. In a check valve, a valve body having a chamber formed therein and a central valve seat opening upon one side of the valve body, and communicating with said chamber, said body having a plurality of openings also communicating with said chamber and opening upon the opposite side of the valve body, the latter side of the valve body having a chamber formed therein, a spring pressed valve normally engaged upon said seat to close the passage of fluid through the first named chamber, said valve being provided at one end with a plunger operating in the second named chamber, and said valve body having additional openings through which pressure fluid is admitted to the latter chamber to act against the plunger and move the valve to an open position.

4. In a check valve, a valve body having a fluid passage formed therein, opening upon the opposite side faces of said body, said body being provided in one side with a chamber and having a valve seat of relatively small diameter in the opposite side thereof and a valve member movable in the valve body, said valve body having a tubular extension projecting from the latter side thereof in concentric relation to the valve seat and said extension being provided with a plurality of openings for the admission of fluid, a head fixed to the valve stem and reciprocating in said tubular extension, a spring urging the head in one direction to normally retain the valve member upon its seat and close said passage in the valve body, said body having a plurality of additional passages communicating with the said chamber for the admission of fluid under pressure, said fluid acting against said plunger to move the valve to an open position.

5. In combination with a fluid containing cylinder having a by-pass affording communication between the opposite ends of the cylinder and a piston reciprocating in said cylinder, a check valve carried by said piston, the valve proper being of relatively small diameter and normally closed to prevent flow of the fluid from one side of the piston to the other and said valve being provided with a plunger of relatively large diameter and means for causing the fluid under pressure to act against one side of the plunger in the movement of the piston in one direction and thereby opening the valve to permit of the free passage of the fluid from one side of the piston to the other.

6. In combination with a fluid containing cylinder and a hollow piston reciprocating therein and in communication at one of its ends with the cylinder chamber, of a check valve mounted in one end of said piston and including a valve body, a normally closed spring pressed valve member preventing flow of the fluid from one side of the piston to the other in the movement of the piston in one direction, said valve member being provided with a plunger operating in the valve body and said body having openings therein to cause the fluid under pressure to act against the plunger in the movement of the piston in an opposite direction whereby the valve member is moved to its open position to permit of the free passage of the fluid through the valve body from one side to the other thereof.

7. In a check valve, a valve body having a fluid passage therethrough and a valve seat of relatively small diameter, a valve normally closing the passage at the seat, a second fluid passage through the valve body closed from the first passage, and a piston of relatively large diameter for moving the valve to open and close it and actuated to open the valve by the pressure of the fluid passing through the second named passage.

In testimony that I claim the foregoing as my invention, I have signed my name hereunder.

MAX HAEBERLEIN.